United States Patent
Segawa et al.

(10) Patent No.: US 11,946,897 B2
(45) Date of Patent: Apr. 2, 2024

(54) GAS SENSOR

(71) Applicant: DENSO CORPORATION, Kariya (JP)

(72) Inventors: Yoshihide Segawa, Kariya (JP); Junta Zushi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/766,485

(22) PCT Filed: Sep. 28, 2016

(86) PCT No.: PCT/JP2016/078580
§ 371 (c)(1),
(2) Date: Apr. 6, 2018

(87) PCT Pub. No.: WO2017/061313
PCT Pub. Date: Apr. 13, 2017

(65) Prior Publication Data
US 2018/0313781 A1 Nov. 1, 2018

(30) Foreign Application Priority Data

Oct. 9, 2015 (JP) ................... 2015-201220
Jun. 13, 2016 (JP) ................... 2016-117272

(51) Int. Cl.
*G01N 27/407* (2006.01)
*G01N 27/409* (2006.01)
*G01N 27/41* (2006.01)

(52) U.S. Cl.
CPC ......... *G01N 27/41* (2013.01); *G01N 27/4073* (2013.01); *G01N 27/4075* (2013.01);
(Continued)

(58) Field of Classification Search
CPC ....... G01N 27/41; G01N 27/407–4073; G01N 27/4075–4078; G01N 27/406;
(Continued)

(56) References Cited

U.S. PATENT DOCUMENTS

| 4,505,783 A | 3/1985 | Mase et al. |
| 2001/0052471 A1 | 12/2001 | Nakagawa et al. |

(Continued)

FOREIGN PATENT DOCUMENTS

| JP | 1-227362 | 9/1989 |
| JP | 5-018938 | 1/1993 |

(Continued)

OTHER PUBLICATIONS

ChaoYang et al., Preparation of nano-structured Pt-YSZ composite and its application in oxygen potentiometric sensor, Applied Surface Science, vol. 257, Issue 18, pp. 7952-7958 (2011) (Year: 2011).*

(Continued)

*Primary Examiner* — Joshua L Allen
*Assistant Examiner* — Vivian A Tran
(74) *Attorney, Agent, or Firm* — Nixon & Vanderhye P.C.

(57) ABSTRACT

A gas sensor is provided which has improved responsiveness and is capable of improving accuracy in measurement of an imbalance between cylinders. The gas sensor includes a solid electrolyte having oxygen ion conductivity, a measurement electrode mounted on one principal surface of the solid electrolyte and is exposed to measurement gas, and a reference electrode mounted on the other principal surface of the solid electrolyte and exposed to reference gas A. Interface capacitance between crystal particles constituting the solid electrolyte is not more than 150 µF. Interface resistance between the crystal particles constituting the solid electrolyte and each of the measurement electrode and the reference electrode is not more than 80 Ω. The measurement electrode has a film thickness t1 of 2 to 8 µm.

2 Claims, 7 Drawing Sheets

(52) U.S. Cl.
CPC ..... *G01N 27/4076* (2013.01); *G01N 27/4077* (2013.01); *G01N 27/409* (2013.01)

(58) Field of Classification Search
CPC ......... G01N 27/409; G01N 27/22–221; G01N 27/228; G01N 2027/222; G01N 27/4077
See application file for complete search history.

(56) References Cited

U.S. PATENT DOCUMENTS

| | | | |
|---|---|---|---|
| 2002/0108854 A1* | 8/2002 | Labarge | G01N 27/4073 204/424 |
| 2003/0116448 A1 | 6/2003 | Nakae et al. | |
| 2004/0144645 A1* | 7/2004 | Yamada | G01N 27/4077 204/424 |
| 2013/0255352 A1 | 10/2013 | Ohtsubo et al. | |
| 2014/0311906 A1* | 10/2014 | Oya | G01N 27/41 204/424 |
| 2015/0253282 A1 | 9/2015 | Satou | |
| 2015/0276654 A1 | 10/2015 | Araki | |

FOREIGN PATENT DOCUMENTS

| | | | | |
|---|---|---|---|---|
| JP | 2000-65789 | | 3/2000 | |
| JP | 2004-294079 | | 10/2004 | |
| JP | 2009-192518 | | 8/2009 | |
| JP | 2012-021895 | | 2/2012 | |
| JP | 2014122878 A | * | 7/2014 | ......... G01N 27/4075 |
| JP | 2015-45568 | | 3/2015 | |
| JP | 2020-512524 | | 4/2020 | |

OTHER PUBLICATIONS

Rheaume, Solid State Electrochemical Sensors for Nitrogen Oxide (NOx) Detection in Lean Exhaust Gases, University of California, Berkeley (2010) (Year: 2010).*

Miura et al., Impedancemetric gas sensor based on zirconia solid electrolyte and oxide sensing electrode for detecting total NOx at high temperature, Sensors and Actuators B, vol. 93, pp. 221-228 (2003) (Year: 2003).*

Electronic and Electric technologies (Advanced Materials and Apparatuses), Kobe Steel Engineering Reports/vol. 65, No. 2 (Sep. 2015), pp. 92-97 (6 pgs.) and translation (16 pgs.).

* cited by examiner

GAS SENSOR

This application is the U.S. national phase of International Application No. PCT/JP2016/078580 filed 28 Sep. 2016, which designated the U.S. and claims priority to JP Patent Application No. 2015-201220 filed 9 Oct. 2015, and JP Patent Application No. 2016-117272 filed 13 Jun. 2016, the entire contents of each of which are hereby incorporated by reference.

TECHNICAL FIELD

The present invention relates to a gas sensor which includes electrodes on both surfaces of a solid electrolyte.

BACKGROUND ART

According to a gas sensor which is provided inside an exhaust pipe of an internal combustion engine, concentration of oxygen, concentration of a specific gas component, and the like in the measurement gas are measured by considering air as the reference gas. The measurement gas is an exhaust gas which is exhausted from the internal combustion engine. A sensor element of the gas sensor includes a solid electrolyte, a measurement electrode, and a reference electrode. The measurement electrode is mounted on the principal surface of the solid electrolyte which is exposed to the measurement gas. The reference electrode is mounted on the principal surface of the solid electrolyte which is exposed to the reference gas. When the gas sensor is used as an air-fuel ratio sensor, three electric currents which are generated between the measurement electrode and the reference electrode via the solid electrolyte due to a difference in oxygen concentration are measured. An air-fuel ratio in the internal combustion engine is calculated based on the oxygen concentration in the measurement gas.

An exhaust gas which is successively exhausted from each of cylinders of the internal combustion engine successively flows in the exhaust pipe while being mixed as appropriate. The exhaust gas then successively reaches the measurement electrode of the sensor element of the gas sensor. Oxygen concentration in the exhaust gas which is the measurement gas and has successively flowed in the exhaust pipe is successively obtained based on an electric current which flows between the measurement electrode and the reference electrode.

The gas sensor is required to accurately detect variations in air-fuel ratio between the cylinders (an imbalance between the cylinders). The variations in air-fuel ratio between the cylinders are caused, for example, by variations in an amount of fuel which is injected by a fuel injection device of each of the cylinders. According to the internal combustion engine, the variations in air-fuel ratio between the cylinders detected by the gas sensor affect the fuel injection device of each of the cylinders. This reflection controls so that the variations in air-fuel ratio between the cylinders are reduced.

For example, according to a gas sensor of PTL 1, a design for improving responsiveness of the gas sensor has been applied. This is to detect an imbalance which is a phenomenon in which an air-fuel ratio varies between cylinders of a multiple cylinder engine. Specifically, a detection section of a detection element is covered with double protectors. A plurality of outer holes are provided in an outer protector of the double protectors. A plurality of inner holes are provided in an inner protector of the double protectors. An area of an opening of each of the outer holes is greater than an area of an opening of each of the inner holes. This reduces time required for gas to be detected to be introduced into the detection section of the detection element via the plurality of outer holes and the plurality of inner holes, and thus responsiveness of the gas sensor is improved.

CITATION LIST

Patent Literature

PTL 1: JP 2012-21895 A

SUMMARY OF THE INVENTION

Technical Problem

In order to accurately detect an imbalance between the cylinders, it is important to allow the exhaust gas to promptly reach the measurement electrode of the gas sensor. Furthermore, it is also important to allow an oxygen ion (oxide ion) to promptly pass through between the measurement electrode and the reference electrode via the solid electrolyte. The oxygen ion is ionized oxygen which is contained in the exhaust gas.

According to a conventional gas sensor, however, no measures have been taken to allow the oxygen ion to promptly pass through between the measurement electrode and the reference electrode via the solid electrolyte. Thus, in order to improve responsiveness of the gas sensor and accurately detect an imbalance between the cylinders, further measures are required.

The present invention has been made in view of the circumstances and has been obtained to provide a gas sensor which has improved responsiveness and is capable of improving accuracy in measurement of an imbalance between cylinders.

Solution to Problem

According to an aspect of the present invention, in a gas sensor (1) which includes a sensor element (10), a solid electrolyte (2), a measurement electrode (31), and a reference electrode (32) are included. The sensor element (10) is for measuring gas concentration. The solid electrolyte (2) has oxygen ion conductivity. The solid electrolyte (2) has principal surfaces which face each other, and one of the principal surfaces is a first principal surface and the other one of the principal surfaces is a second principal surface. The measurement electrode (31) is mounted on the first principal surface and is exposed to measurement gas (G). The reference electrode (32) is mounted on the second principal surface and is exposed to reference gas (A).

According to the gas sensor, interface capacitance (C2) between crystal particles (201) which constitute the solid electrolyte is not more than 150 µF.

Advantageous Effects of the Invention

According to the gas sensor, the interface capacitance between the crystal particles which constitute the solid electrolyte is not more than 150 µF.

An equivalent circuit of the solid electrolyte of the gas sensor can be expressed as a sum of internal resistance, grain boundary resistance and grain boundary capacitance, and interface resistance and interface capacitance. The internal resistance is internal resistance in the crystal particles constituting the solid electrolyte. The grain boundary resistance and the grain boundary capacitance are grain boundary resistance and grain boundary capacitance between the crystal particles constituting the solid electrolyte. The crystal particles constitute the solid electrolyte. The interface resistance and the interface capacitance are interface resistance and interface capacitance between the crystal particles and each of the measurement electrode and the reference electrode. In the gas sensor, the interface capacitance is minimized as much as possible. With this minimization, an oxygen ion can easily move between the measurement electrode and the reference electrode through the solid electrolyte when the gas sensor is used. This makes it possible to improve responsiveness of the gas sensor when a difference between oxygen concentration in the measurement gas and oxygen concentration in the reference gas is detected. The measurement gas is brought into contact with the measurement electrode. The reference gas is brought into contact with the reference electrode.

Thus, according to the gas sensor, it is possible to improve responsiveness of the gas sensor and improve accuracy in measurement of an imbalance between cylinders.

Reference signs in parentheses for components shown in an aspect of the present invention indicate a correspondence relationship with reference signs in the drawings for embodiments. Note, however, that the components are not limited to those of the embodiments.

DESCRIPTION OF THE EMBODIMENTS

Figure 1:
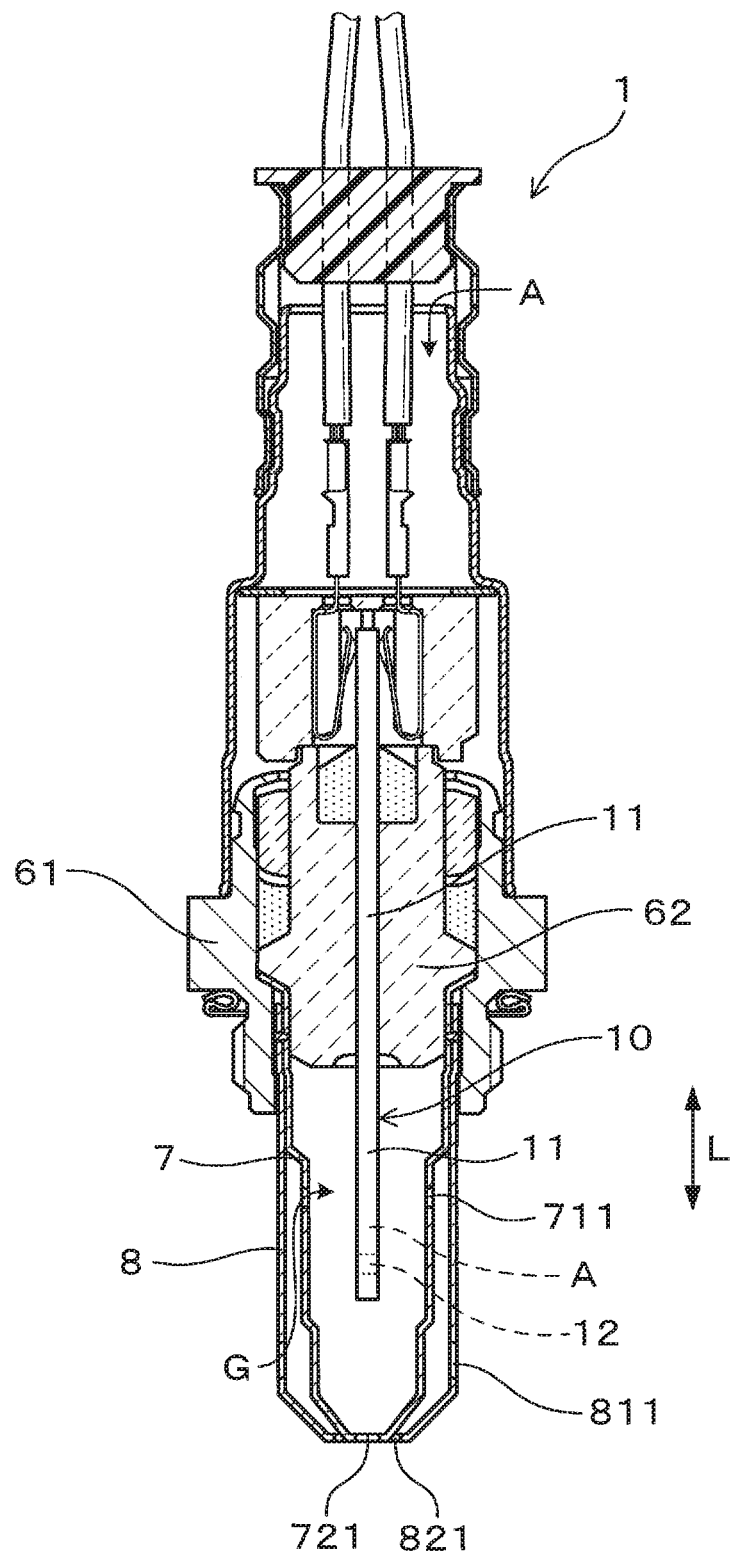
FIG. 1 is an overall cross-sectional view illustrating a gas sensor according to Embodiment 1.

The following description discusses preferred embodiments of the gas sensor described above.

Although the smaller interface capacitance is more preferable, in terms of ease of production, the interface capacitance can be not less than 50 µF. The interface capacitance is considered to become smaller as an interface between the solid electrolyte and the electrodes is less polarized.

The interface resistance between the crystal particles constituting the solid electrolyte and each of the measurement electrode and the reference electrode may be 80Ω or less.

The interface resistance is minimized as much as possible. With this minimization, the oxygen ion can easily move between the measurement electrode and the reference electrode via the solid electrolyte when the gas sensor is used. This makes it possible to further improve responsiveness of the gas sensor when a difference between the oxygen concentration in the measurement gas and the oxygen concentration in the reference gas is detected. The measurement gas is brought into contact with the measurement electrode. The reference gas is brought into contact with the reference electrode.

Although the smaller interface resistance is more preferable, in terms of ease of production, the interface resistance may be 20Ω or less. The interface resistance is considered to become smaller as the crystal particles and each of the electrodes are more finely complexed. The crystal particles constitute the solid electrolyte. Each of the electrodes contains platinum and the like.

The measurement electrode can have a film thickness of 2 to 8 µm.

In this case, the film thickness of the measurement electrode is minimized as much as possible. With this minimization, the oxygen ion can easily move between the measurement electrode and the reference electrode through the solid electrolyte when the gas sensor is used. This makes it possible to further improve responsiveness of the gas sensor when a difference between the oxygen concentration in the measurement gas and the oxygen concentration in the reference gas is detected. The measurement gas is brought into contact with the measurement electrode. The reference gas is brought into contact with the reference electrode.

In terms of production, it is difficult to produce the measurement electrode having a film thickness of less than 2 µm. Meanwhile, when the measurement electrode has a film thickness of more than 8 µm, it becomes difficult to yield an effect in which the oxygen ion can easily move. Furthermore, the measurement electrode can have a film thickness of less than 8 µm or not more than 7 µm.

The following describes embodiments of the gas sensor with reference to the drawings.

Embodiment 1

As shown in FIGS. 1 to 4, a gas sensor 1 of the present embodiment includes a sensor element 10 for measuring gas concentration. The sensor element 10 includes a solid electrolyte 2, a measurement electrode 31, and a reference electrode 32. The solid electrolyte 2 has oxygen ion conductivity. The solid electrolyte 2 has principal surfaces which face each other. One of the principal surfaces is considered as a first principal surface, and the other one of the principal surfaces is considered as a second principal surface. The measurement electrode 31 is mounted on the first principal surface and is exposed to measurement gas G. The reference electrode 32 is mounted on the second principal surface and is exposed to reference gas A. Interface capacitance C2 between crystal particles 201 (constituting the solid electrolyte 2) and each of the measurement electrode 31 and the reference electrode 32 is not more than 150 µF. Interface resistance R2 between the crystal particles 201 constituting the solid electrolyte 2 and each of the measurement electrode 31 and the reference electrode 32 is not more than 80Ω. The measurement electrode 31 has a film thickness t1 of 2 to 8 μm, and the reference electrode 32 has a film thickness t2 of 2 to 15 μm.

The gas sensor 1 is provided inside an exhaust pipe of an engine as an internal combustion engine, and exhaust gas which passes through the exhaust pipe is considered as the measurement gas G. Oxygen concentration in the measurement gas G is obtained by considering air as the reference gas A. An A/F (air-fuel ratio) in the engine is obtained based on the oxygen concentration.

The gas sensor 1 of the present embodiment is an A/F sensor which quantitatively obtains the air-fuel ratio in the engine. The A/F sensor calculates the air-fuel ratio in the engine by using a limiting current characteristic based on diffusion rate control of the measurement gas G. Other than this, the gas sensor 1 can be a concentration cell type gas sensor. The concentration cell type gas sensor detects whether the air-fuel ratio is in a rich state where fuel is excessive with respect to a theoretical air-fuel ratio or in a lean state where air is excessive with respect to the theoretical air-fuel ratio. The air-fuel ratio is a mixing ratio of fuel and air in the engine.

The engine includes a plurality of cylinders. In the plurality of cylinders, an air-fuel mixture of air and fuel which is injected at different timings from a fuel injection device of each of the cylinders combusts. After the air-fuel mixture combusts in each of the cylinders, exhaust gas obtained after the combustion is successively exhausted from each of the cylinders into the exhaust pipe.

In the exhaust pipe, as shown in FIG. 1, the exhaust gas is successively taken into a gas measurement section 12 of the sensor element 10 via outer through holes 811 and inner through holes 711 in an inner cover 7. The outer through holes 811 are provided in an outer cover 8 of the gas sensor 1. The inner through holes 711 are provided in the inner cover 7 of the gas sensor 1. According to the gas sensor 1, the exhaust gas which is exhausted from each of the cylinders is considered as the measurement gas G. The air-fuel ratio in each of the cylinders is successively obtained based on the oxygen concentration in the measurement gas G. A difference (variations) in air-fuel ratio between the cylinders is referred to as imbalance in air-fuel ratio between the cylinders. Thus, in order to accurately obtain the imbalance between the cylinders, responsiveness of the gas sensor 1 needs to be improved.

As shown in FIG. 1, the gas sensor 1 includes the sensor element 10, an insulator 62, a housing 61, the inner cover 7, and the outer cover 8. The insulator 62 holds the sensor element 10. The housing 61 holds the insulator 62. The inner cover 7 and the outer cover 8 are held by the housing 61. The inner cover 7 and the outer cover 8 cover a projecting section 11 of the sensor element 10 which projecting section 11 is projected from the insulator 62. The projecting section 11 has the gas measurement section 12 into which the measurement gas G is taken and in which the oxygen concentration in the measurement gas G is measured. Inner through holes 711 and 721 through which the measurement gas G passes are formed in the inner cover 7. Outer through holes 811 and 821 through which the measurement gas G passes are formed in the outer cover 8.

Instead of double protective covers which are constituted by the inner cover 7 and the outer cover 8, a single protective cover can also be used.

Figure 2:
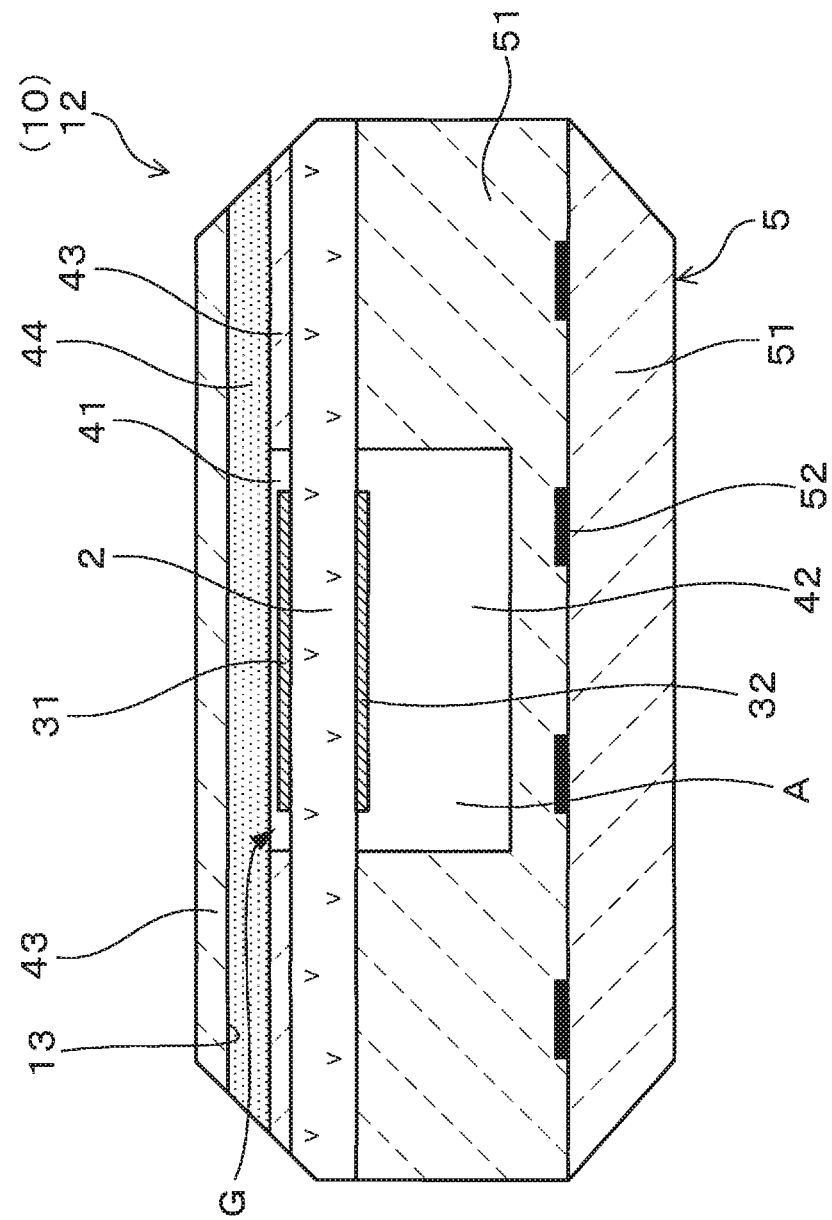
FIG. 2 is a view illustrating a cross section of a sensor element of the gas sensor according to Embodiment 1, taken along the direction orthogonal to the longitudinal direction of the sensor element.

As shown in FIG. 2, the gas measurement section 12 includes an introduction section 13, the measurement electrode 31, the reference electrode 32, and a part of the solid electrolyte 2. The measurement gas G is introduced into the introduction section 13. The part of the solid electrolyte 2 is sandwiched between the measurement electrode 31 and the reference electrode 32. A heater 5 is stacked on the solid electrolyte 2 of the sensor element 10. The heater 5 is constituted by a ceramic substrate 51 and heating elements 52. The heater 5 activates the solid electrolyte 2 and the electrodes 31 and 32 by heating the solid electrolyte 2 and the electrodes 31 and 32.

A measurement gas chamber 41 into which the measurement gas G is introduced is formed on the first principal surface of the solid electrolyte 2. The measurement electrode 31 is provided inside the measurement gas chamber 41. The measurement gas chamber 41 is formed by being surrounded by an insulating body 43, a diffusion resistance layer 44, and the solid electrolyte 2. The measurement gas G passes through the diffusion resistance layer 44 at a predetermined diffusion rate. A reference gas chamber 42 into which the reference gas A is introduced is formed on the second principal surface of the solid electrolyte 2. The reference electrode 32 is provided inside the reference gas chamber 42. The heater 5 which is stacked on the solid electrolyte 2 is constituted by the heating elements 52 and the ceramic substrate 51. The heating elements 52 generate heat by energization of the heater 5. The heating elements 52 are buried in the ceramic substrate 51. The reference gas chamber 42 is formed by being surrounded by the ceramic substrate 51 and the solid electrolyte 2.

Figure 3:
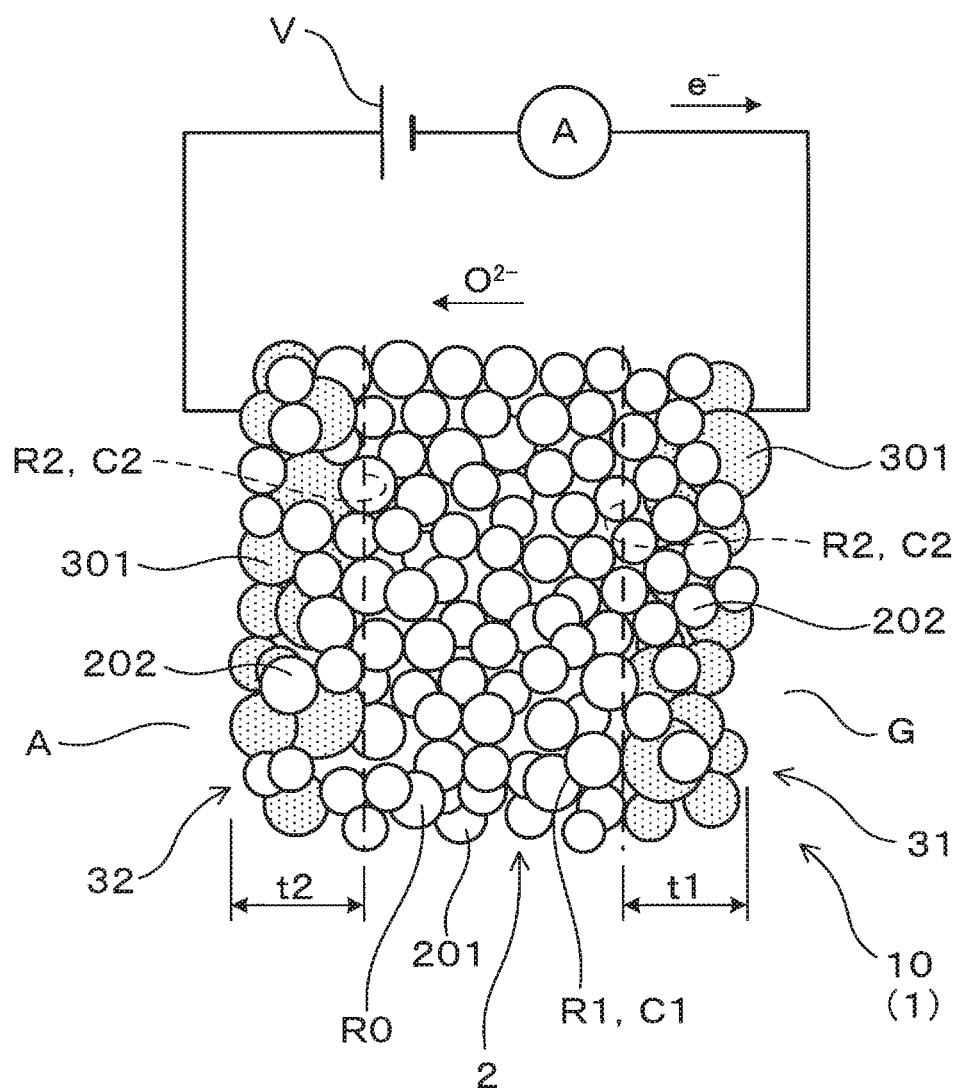
FIG. 3 is a schematic view illustrating a micro-structure of a solid electrolyte, a measurement electrode, and a reference electrode according to Embodiment 1.

As shown in FIG. 3, the solid electrolyte 2 is formed by many combined crystal particles 201 and has a plate shape. The crystal particles 201 are made of yttria partially stabilized zirconia (hereinafter referred to as zirconia). The crystal particles 201 are connected to each other by being sintered. The measurement electrode 31 and the reference electrode 32 contain noble metal components 301 such as platinum and zirconia components 202. The zirconia components 202 are used as a material in common with that of the solid electrolyte 2. The crystal particles 201 are made of the same material as the zirconia components 202.

Stabilized zirconia or partially stabilized zirconia can be used for the solid electrolyte 2. In the stabilized zirconia, zirconia is partially substituted by a rare earth metal element or an alkaline earth metal element.

As the A/F sensor, the gas sensor 1 of the present embodiment is used by applying a predetermined voltage V exhibiting a limiting current characteristic between the measurement electrode 31 and the reference electrode 32. An interface M indicates an interface between the noble metal components 301 and the zirconia components 202 of the measurement electrode 31. An interface N indicates an interface between the noble metal components 301 and the zirconia components 202 of the reference electrode 32. In the interface M, an oxygen molecule $O_2$ in the measurement gas G receives an electron $e^-$ and becomes an oxygen ion $O^{2-}$. The oxygen ion $O^{2-}$ then passes through the solid electrolyte 2 from the measurement electrode 31 to the reference electrode 32. The oxygen ion $O^{2-}$ that has passed through the solid electrolyte 2 transfers the electron $e^-$ in the interface N and becomes the oxygen molecule $O_2$ again.

Figure 4:
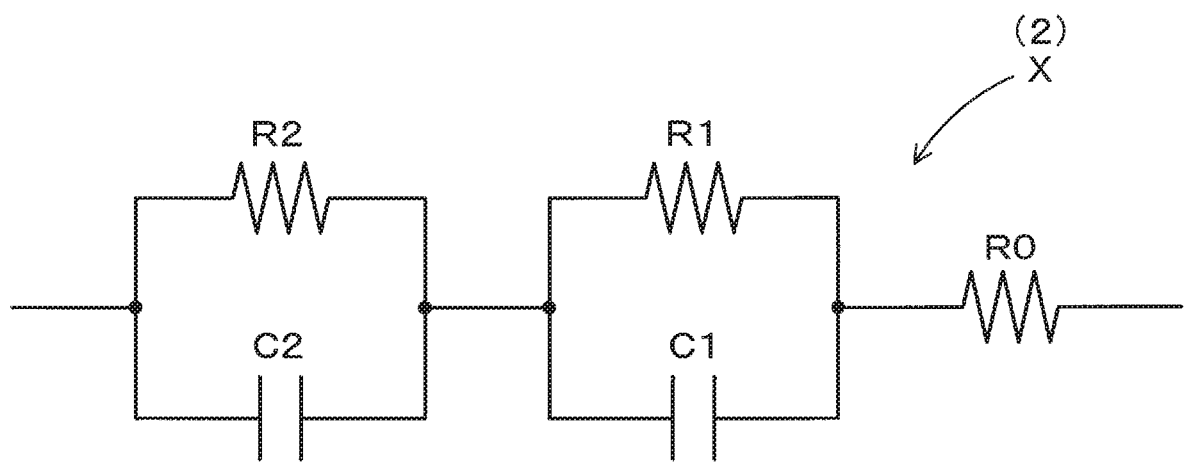
FIG. 4 is a view illustrating an equivalent circuit of the solid electrolyte according to Embodiment 1.

As shown in FIGS. 3 and 4, an equivalent circuit Q of the solid electrolyte 2 of the gas sensor 1 can be expressed as a sum of internal resistance R0, grain boundary resistance R1 and grain boundary capacitance C1, and interface resistance R2 and interface capacitance C2. The internal resistance R0 is internal resistance in the crystal particles 201 constituting the solid electrolyte 2. The grain boundary resistance R1 and the grain boundary capacitance C1 are grain boundary resistance and grain boundary capacitance between the crystal particles 201 constituting the solid electrolyte 2. The crystal particles 201 constitute the solid electrolyte. The interface resistance R2 and the interface capacitance C2 are interface resistance and interface capacitance between the crystal particles 201 and each of the measurement electrode 31 and the reference electrode 32. The following description discusses the internal resistance R0, the grain boundary resistance R1 and the grain boundary capacitance C1, and the interface resistance R2 and the interface capacitance C2. These are based on the premise that an electric current is flowing between the measurement electrode 31 and the reference electrode 32 via the solid electrolyte 2.

The internal resistance R0 is resistance generated in the plurality of crystal particles 201 constituting the solid electrolyte 2 themselves. A value of the internal resistance R0 changes depending on a material of the crystal particles 201.

The grain boundary resistance R1 is resistance generated between the crystal particles 201 constituting the solid electrolyte 2. The grain boundary capacitance C1 is capacitance generated between the crystal particles 201 constituting the solid electrolyte 2. Values of the grain boundary resistance R1 and the grain boundary capacitance C1 change depending on how the plurality of crystal particles 201 are in contact with each other.

The interface resistance R2 is resistance generated between the crystal particles 201 constituting the solid electrolyte 2 and the measurement electrode 31 and between the crystal particles 201 constituting the solid electrolyte 2 and the reference electrode 32. The interface capacitance C2 indicates capacitance between the crystal particles 201 (constituting the solid electrolyte 2) and each of the measurement electrode 31 and the reference electrode 32. Values of the interface resistance R2 and the interface capacitance C2 change depending on how the plurality of crystal particles 201 are in contact with the measurement electrode 31 and how the plurality of crystal particles 201 are in contact with the reference electrode 32.

The interface capacitance C2 and the interface resistance R2 of the solid electrolyte 2 can be obtained by a dynamic signal analyzer which performs a fast Fourier transformation (FFT) and performs signal analysis. The values of the interface capacitance C2 and the interface resistance R2 can be values at 700 to 800° C. which is a temperature at which the gas sensor 1 is used.

The solid electrolyte 2 is cut at a position where the measurement electrode 31 is formed. The film thickness t1 of the measurement electrode 31 and the film thickness t2 of the reference electrode 32 can be obtained by observing a cross section of the solid electrolyte 2 under a scanning electron microscope (SEM).

Figure 5:
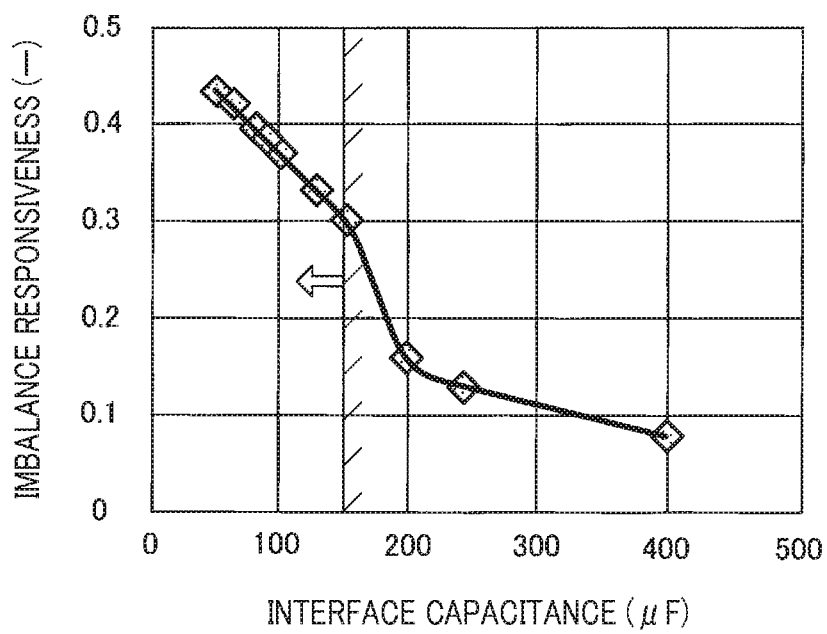
FIG. 5 is a graph showing a relationship between interface capacitance and imbalance responsiveness according to Embodiment 1.

FIG. 5 shows a relationship between the interface capacitance C2 (F) and imbalance responsiveness (–). The imbalance responsiveness is expressed as a ratio (Y/X) between an amplitude X of a theoretical air-fuel ratio (A/F) and an amplitude Y of an air-fuel ratio which is actually outputted by the gas sensor 1. The imbalance responsiveness indicates a speed of response for obtaining an imbalance. The theoretical air-fuel ratio (A/F) is based on a change in oxygen concentration in the measurement gas G which is supplied to the gas sensor 1. The imbalance is a difference which occurs in air-fuel ratio between the cylinders. As a value of the imbalance responsiveness is increased to be closer to one, the responsiveness becomes better.

A plurality of gas sensors 1 which vary in interface capacitance C2 of the solid electrolyte 2 are prepared. FIG. 5 shows a result showing the imbalance responsiveness obtained when the oxygen concentration in the measurement gas G is measured by each of the gas sensors 1.

As shown in FIG. 5, as the interface capacitance C2 increases, the imbalance responsiveness decreases. In the vicinity of the interface capacitance C2 greater than 150 μF, the imbalance responsiveness suddenly decreases. This indicates that the gas sensor 1 can have favorable imbalance responsiveness by setting the interface capacitance C2 to be not more than 150 μF.

In terms of performance required for the gas sensor 1, the imbalance responsiveness needs to be not less than 0.25 to 0.3.

Figure 6:
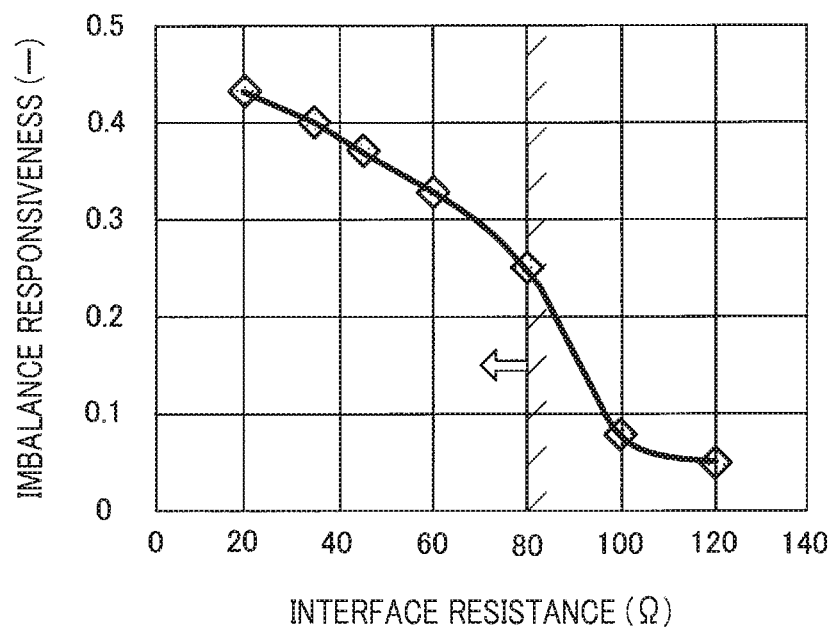
FIG. 6 is a graph showing a relationship between interface resistance and the imbalance responsiveness according to Embodiment 1.

FIG. 6 shows a relationship between the interface resistance R2 (Ω) and the imbalance responsiveness (–). A plurality of gas sensors 1 which vary in interface resistance R2 of the solid electrolyte 2 are prepared. FIG. 6 shows a result showing the imbalance responsiveness obtained when the oxygen concentration in the measurement gas G is measured by each of the gas sensors 1.

As shown in FIG. 6, as the interface resistance R2 increases, the imbalance responsiveness decreases. In the vicinity of the interface resistance R2 greater than 80Ω, the imbalance responsiveness suddenly decreases as compared with other portions. This indicates that the gas sensor 1 can have favorable imbalance responsiveness by setting the interface resistance R2 to be not more than 80Ω.

Figure 7:
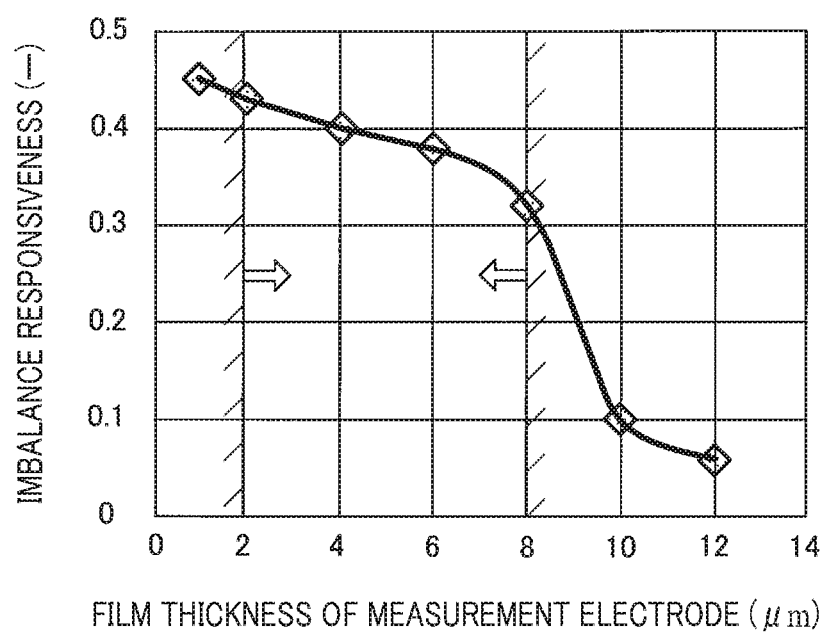
FIG. 7 is a graph showing a relationship between a film thickness of the measurement electrode and the imbalance responsiveness according to Embodiment 1.

FIG. 7 shows a relationship between the film thickness t1 [[(m)]](μm) of the measurement electrode 31 and the imbalance responsiveness (–). A plurality of gas sensors 1 which vary in film thickness t1 of the measurement electrode 31 are prepared. FIG. 7 shows a result showing the imbalance responsiveness obtained when the oxygen concentration in the measurement gas G is measured by each of the gas sensors 1.

As shown in FIG. 7, as the film thickness t1 of the measurement electrode 31 increases, the imbalance responsiveness decreases. In the vicinity of the film thickness t1 of the measurement electrode 31 greater than 8 μm, the imbalance responsiveness suddenly decreases as compared with other portions. This indicates that the gas sensor 1 can have favorable imbalance responsiveness by setting the film thickness t1 of the measurement electrode 31 to be not more than 8 μm. The measurement electrode 31 having the film thickness t1 of less than 2 μm is difficult to produce.

According to the gas sensor 1 of the present embodiment, the imbalance responsiveness of the gas sensor 1 can be improved by prescribing the interface capacitance C2, the interface resistance R2, and the film thickness t1 of the measurement electrode 31. The interface capacitance C2 is interface capacitance between the crystal particles 201 constituting the solid electrolyte 2. The interface resistance R2 is interface resistance between each of the crystal particles 201 constituting the solid electrolyte 2, each of the measurement electrode 31 and the reference electrode 32. Specifically, the values of the interface capacitance C2, the interface resistance R2, and the film thickness t1 of the measurement electrode 31 are set to be not more than prescribed values. This allows the oxygen ion 02- to easily move between the measurement electrode 31 and the reference electrode 32 via the solid electrolyte 2 when the gas sensor 1 is used. This makes it possible to improve responsiveness of the gas sensor 1 when a difference between the oxygen concentration in the measurement gas G and the oxygen concentration in the reference gas A is detected. The measurement gas G is brought into contact with the measurement electrode 31. The reference gas A is brought into contact with the reference electrode 32.

The imbalance between the cylinders indicates an imbalance which occurs in air-fuel ratio between the cylinders of the engine. Timings at which the exhaust gas is exhausted from each of the cylinders of the engine into the exhaust pipe vary as appropriate. The imbalance between the cylinders is measured by observing a sequentially repeated momentary change in oxygen concentration in the exhaust gas which reaches the gas sensor 1. In order to improve accuracy in measurement of the imbalance between the cylinders, therefore, the imbalance responsiveness when the oxygen concentration is detected by the gas sensor 1 needs to be further improved so that the momentary change in oxygen concentration can be measured.

The change in oxygen concentration in the exhaust gas is measured based on a change in oxygen ion $O^{2-}$ which moves between the measurement electrode 31 and the reference electrode 32 through the solid electrolyte 2. Thus, in order to measure the imbalance between the cylinders, it is important to set the values of the interface capacitance C2, the interface resistance R2, and the film thickness t1 of the measurement electrode 31 to be not more than the prescribed values.

According to the gas sensor 1 of the present embodiment, therefore, by setting the values of the interface capacitance C2, the interface resistance R2, and the film thickness t1 of the measurement electrode 31 to be not more than the prescribed values, accuracy in measurement of the imbalance between the cylinders can be improved.

The solid electrolyte 2 and the measurement electrode 31 were obtained by measuring a temperature, a voltage, and a time period for which the voltage is applied. The solid electrolyte 2 has the interface capacitance C2 and the interface resistance R2 described above. The measurement electrode 31 has the film thickness t1 described above. The temperature is a temperature when the solid electrolyte 2 is burned. The voltage is applied between the measurement electrode 31 and the reference electrode 32 of the burned solid electrolyte 2.

When the solid electrolyte 2 has been burned, metal paste has been applied to each surface of a ceramic sheet which constitutes the solid electrolyte 2 and is made of yttria partially stabilized zirconia. The metal paste includes metal paste constituting the measurement electrode 31 and metal paste constituting the reference electrode 32. The solid electrolyte 2 including the measurement electrode 31 and the reference electrode 32 has been formed by burning the solid electrolyte.

Under an air atmosphere, a voltage of 2.5 to 3 V was applied between the measurement electrode 31 and the reference electrode 32 of the burned solid electrolyte 2 for 8 seconds. The voltage is greater than a conventional voltage. Application of the high voltage for an extremely short time period made it possible to produce the solid electrolyte 2 having the interface capacitance C2 and the interface resistance R2 described above.

After the solid electrolyte 2 is burned, the time period for which the voltage is applied between the measurement electrode 31 and the reference electrode 32 can be, for example, 5 to 15 seconds.

The measurement electrode 31 having the film thickness t1 described above has been obtained by making an adjustment to minimize a thickness of the metal paste applied to the ceramic sheet as much as possible and performing the burning and the application of the voltage.

Embodiment 2

Figure 8:
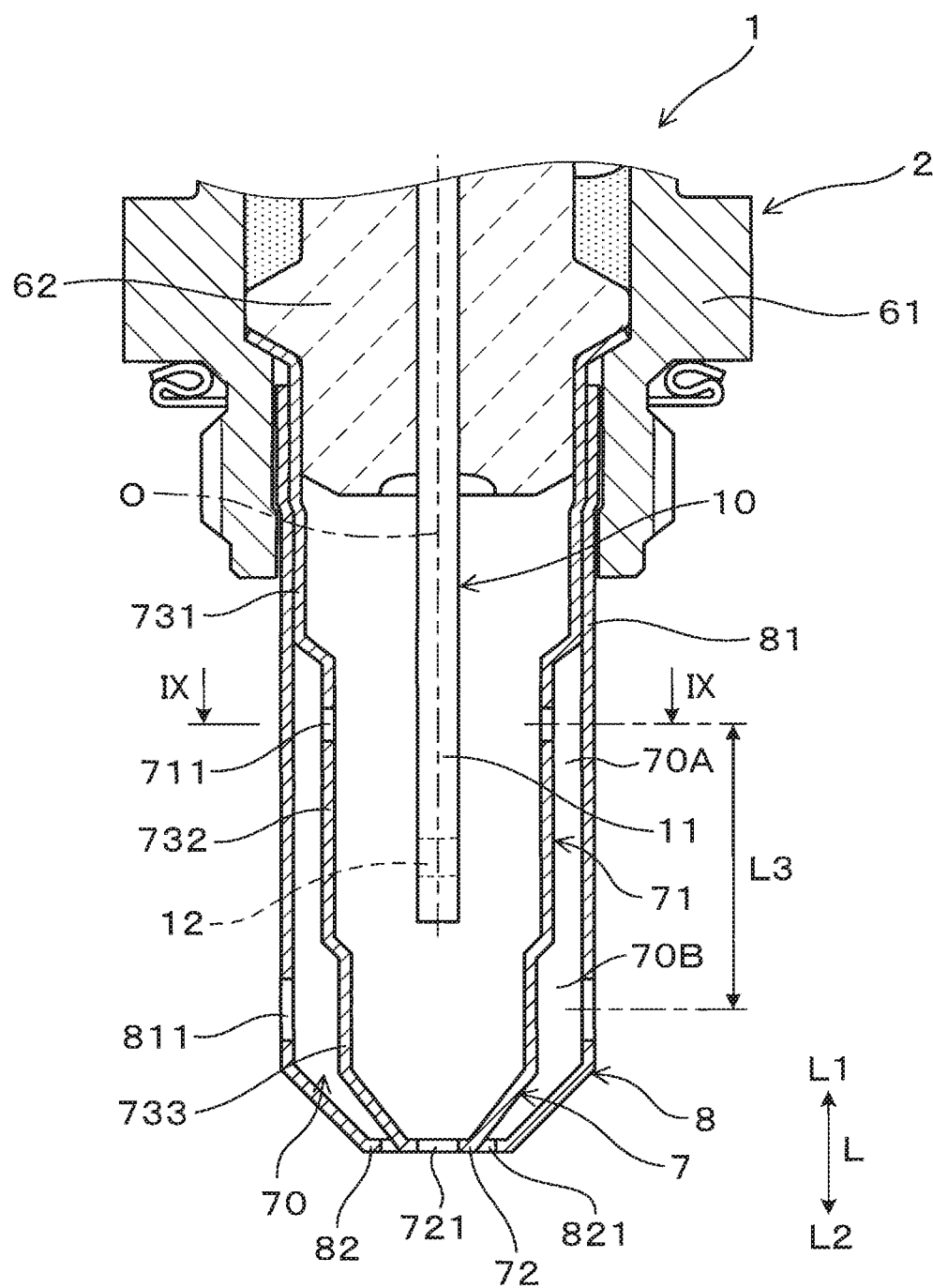
FIG. 8 is a cross-sectional view illustrating a portion around an inner cover and an outer cover of the gas sensor according to Embodiment 2.
Figure 9:
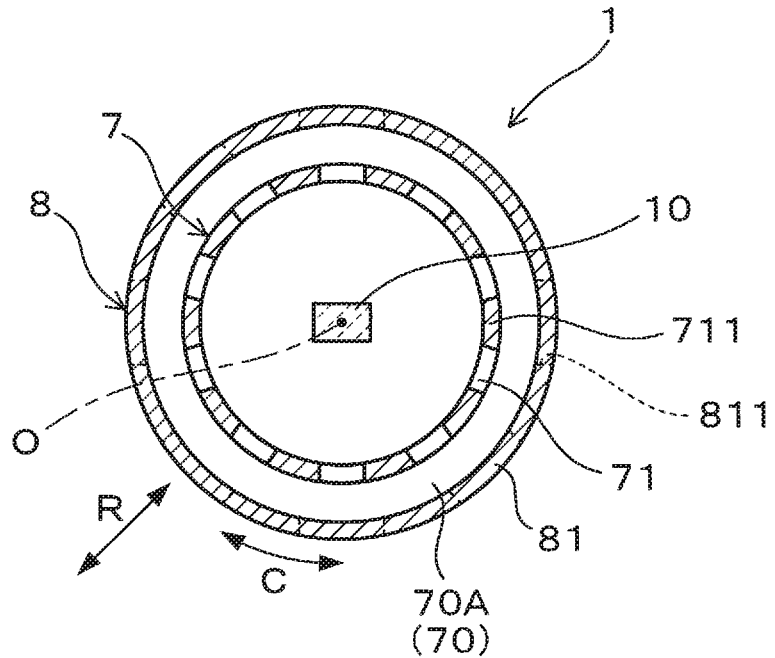
FIG. 9 is a view showing how inner through holes in the inner cover and outer through holes in the outer cover according to Embodiment 2 are formed, and is a cross-sectional explanatory view taken along line IX-IX in FIG. 8.

According to the present embodiment, as shown in FIGS. 8 and 9, configurations of the inner cover 7 which covers the sensor element 10 and the outer cover 8 which covers the inner cover 7 are more specifically described. The following description also discusses an appropriate positional relationship between the inner through holes 711 provided in an inner side wall section 71 of the inner cover 7 and the outer through holes 811 provided in an outer side wall section 81 of the outer cover 8.

According to the gas sensor 1 of the present embodiment, an axial direction L indicates a direction of a center axis O which passes through a center of the sensor element 10. A circumferential direction C indicates a direction which rotates around the axial direction L along a plane orthogonal to the axial direction L. In the axial direction L, a tip end side L2 indicates a side toward which the projecting section 11 is projected from the insulator 62, and a base end side L1 indicates a side opposite to the tip end side L2.

As shown in FIG. 8, the inner cover 7 and the outer cover 8 are formed in a shape of cylinder with bottom. The inner cover 7 has the inner side wall section 71 which is circular and is provided along the circumferential direction C of the inner cover 7 and an inner bottom section 72 which is provided at an end on the tip end side L2 of the inner side wall section 71. The outer cover 8 has the outer side wall section 81 which is circular and is provided along the circumferential direction C of the outer cover 8 and an outer bottom section 82 which is provided at an end on the tip end side L2 of the outer side wall section 81.

The inner side wall section 71 is mounted on an outer periphery of the insulator 62. The inner side wall section 71 has a base end section 731, a middle section 732, and a tip end section 733. The base end section 731 is in close contact with an inner periphery of the outer side wall section 81. The middle section 732 is provided on the tip end side L2 of the base end section 731 and has a reduced diameter as compared with the base end section 731. The tip end section 733 is provided on the tip end side L2 of the middle section 732 and has a reduced diameter as compared with the middle section 732.

In the circumferential direction C, the inner through holes 711 and 721 through which the measurement gas G passes are formed in a plurality of parts of the middle section 732 of the inner side wall section 71 and in a center part of the inner bottom section 72. Furthermore, in the circumferential direction C, the outer through holes 811 and 821 through which the measurement gas passes are formed in a plurality of parts of the outer side wall section 81 and in a center part of the outer bottom section 82. As shown in FIG. 9, in the circumferential direction C, the inner through holes 711 are formed in 8 places at regular intervals in the middle section 732. Furthermore, in the circumferential direction C, the outer through holes 811 are formed in 4 places at regular intervals in the outer side wall section 81.

The inner bottom section 72 of the inner cover 7 is provided in the outer bottom section 82 of the outer cover 8.

As shown in FIGS. 8 and 9, a circulation space 70 which is circular and in which the measurement gas G circulates is formed between the inner side wall section 71 of the inner cover 7 and the outer side wall section 81 of the outer cover 8. The circulation space 70 is constituted by a space section 70A and a space section 70B. The space section 70A is located on an outer periphery side of the middle section 732 of the inner side wall section 71 in the circulation space 70. The space section 70B is located on an outer periphery side of the tip end section 733 of the inner side wall section 71 in the circulation space 70. A width of the space section 70A in a radial direction R is narrower than that of the space section 70B in the radial direction R. The radial direction R indicates a radial direction R around the center axis O of the sensor element 10.

The above configuration of the circulation space 70 can make it difficult for water in the measurement gas G which has entered the circulation space 70 from the outer through holes 811 in the outer side wall section 81 to enter the inner cover 7 from the inner through holes 711 in the inner side wall section 71.

A part P indicates a part of the middle section 732 in the circumferential direction of the middle section 732 which is closer to the base end side L1 in the axial direction L than the gas measurement section 12 is. The part P has a certain length in the axial direction L. In the circumferential direction C, the plurality of inner through holes 711 are provided at regular intervals in the part P. A part Q indicates a part of the outer side wall section 81 in the circumferential direction of the outer side wall section 81 which is closer to the tip end side L2 in the axial direction L than the gas measurement section 12 is. The part Q has a certain length in the axial direction L. In the circumferential direction C, the plurality of outer through holes 811 are provided at regular intervals in the part Q.

As shown in FIG. 8, the gas measurement section 12 is provided between the part P and a position of a step portion between the middle section 732 and the tip end section 733 in the axial direction L of the gas sensor 1. This positional relationship makes it difficult for the measurement gas G which is the exhaust gas exhausted at different times from each of the cylinders of the engine to be mixed with each other in the inner cover 7. Furthermore, accuracy in measurement of the imbalance between the cylinders can be maintained. Furthermore, adhesion of water from the inner through holes 721 in the inner bottom section 72 of the inner cover 7 to the sensor element 10 can be suppressed.

Each of the plurality of inner through holes 711 in the part P has a hole diameter smaller than that of each of the plurality of outer through holes 811 in the part Q. The difference in hole diameter can also make it difficult for the water in the measurement gas G which has entered the circulation space 70 from the outer through holes 811 in the part Q to enter the inner cover 7 from the inner through holes 711 in the part P.

As shown in FIG. 8, a distance (referred to as hole-to-hole distance L3) between a center of each of the inner through holes 711 and a center of a corresponding one of the outer through holes 811 in the axial direction L is in a range of 5 to 11 mm. The distance L3 in the axial direction L is represented as a difference in position between the center of each of the inner through holes 711 and the center of the corresponding one of the outer through holes 811 in the axial direction L.

According to the inner cover 7 of the present embodiment, positions of the plurality of inner through holes 711 in the axial direction L are the same as each other. According to the outer cover 8 of the present embodiment, positions of the plurality of outer through holes 811 in the axial direction L are the same as each other.

However, the positions of the inner through holes 711 in the axial direction L can be different from each other. Furthermore, the positions of the outer through holes 811 in the axial direction L can be different from each other. An average value H indicates an average value (mean value) of positions of the centers of all of the inner through holes 711 in the axial direction L. An average value I indicates an average value (mean value) of positions of the centers of all of the outer through holes 811 in the axial direction L. A distance between the average value H and the average value I is set to be in a range of 5 to 11 mm.

As shown in FIG. 9, in the middle section 732 of the inner side wall section 71 of the present embodiment, the inner through holes 711 are formed in 10 places in the circumferential direction C. In the outer side wall section 81 of the present embodiment, the outer through holes 811 are formed in 8 places in the circumferential direction C. The inner through holes 711 can be formed in 6 to 12 places in the middle section 732 in the circumferential direction C. The outer through holes 811 can be formed in 4 to 10 places in the outer side wall section 81 in the circumferential direction C. An optimum range of 5 to 11 mm for the hole-to-hole distance L3 is the same even when the number of the inner through holes 711 and the number of the outer through holes 811 to be formed are changed.

The positions at which the inner through holes 711 are formed and the positions at which the outer through holes 811 are formed do not need to be in the same radial direction and can be different from each other in radial direction.

A flow of the measurement gas G which has entered the circulation space 70 from the outer through holes 811 in the outer side wall section 81 is divided into the following three streams: a stream flowing in the circumferential direction C in the circulation space 70; a stream flowing toward the tip end side L2 in the axial direction L in the circulation space 70; and a stream flowing toward the base end side L1 in the axial direction L in the circulation space 70. The measurement gas G flowing toward the tip end side L2 in the axial direction L in the circulation space 70 partially flows from the inner through holes 711 in the inner side wall section 71 into the inner cover 7. The measurement gas G is brought into contact with the gas measurement section 12 of the sensor element 10 and is used for measuring the oxygen concentration in the measurement gas G. The measurement gas G which has flowed into the inner cover 7 is subject to a negative pressure effect due to a flow of the measurement gas G in the exhaust pipe in which the gas sensor 1 is mounted. This causes the measurement gas G to pass through the inner through holes 721 in the inner bottom section 72 and flow out of the inner cover 7.

The distance L3 (referred to as hole-to-hole distance) between the center of each of the inner through holes 711 and the center of the corresponding one of the outer through holes 811 in the axial direction L is determined in consideration of the imbalance responsiveness and an amount of water adhering to the sensor element 10.

Figure 10:
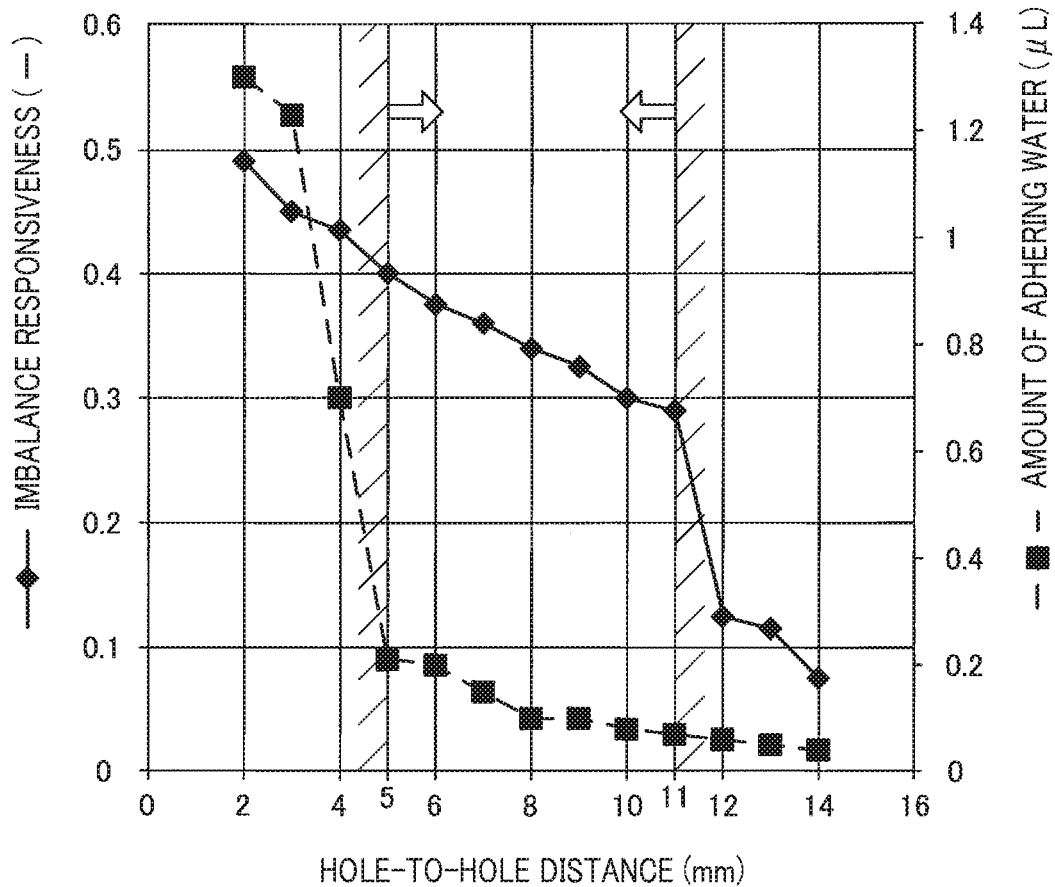
FIG. 10 is a graph showing a relationship between a hole-to-hole distance in the inner cover and the outer cover, the imbalance responsiveness, and an amount of water adhering to the sensor element according to Embodiment 2.

FIG. 10 is a graph showing a relationship between the hole-to-hole distance L3 (mm), the imbalance responsiveness (-), and the amount (L) of water adhering to the sensor element 10. FIG. 10 shows a result showing the imbalance responsiveness and the amount of water adhering to the sensor element 10 obtained when a plurality of gas sensors 1 which vary in hole-to-hole distance L3 in the inner cover 7 and the outer cover 8 are prepared and the oxygen concentration in the exhaust gas is measured by using each of the gas sensors 1.

The method for obtaining the imbalance responsiveness and the content of the imbalance responsiveness are as described above.

The amount of water adhering to the sensor element 10 has been obtained as below.

First, as a preliminary preparation, carbon is applied to a surface of the sensor element 10, and the sensor element 10 is heated to approximately 200° C. so that the carbon is fixed to the sensor element 10. At the time, the carbon exhibits a black color. When water is attached to the sensor element 10 while the gas sensor 1 is used, carbon at a part of the sensor element 10 to which the water has been attached is dispersed. Discoloration in which the black color of the part to which the water has been attached becomes lighter to be closer to a white color is observed.

A correlation between an amount of water attached to the sensor element 10 and a discoloration area (water adhesion mark) of the part of the surface of the sensor element 10 in which the discoloration of the black color occurs is obtained in advance before the amount of water adhering to the sensor element 10 is measured. The gas sensor 1 is provided inside the exhaust pipe of the engine, and when the engine is ignited, the discoloration area on the surface of the sensor element 10 is measured. The discoloration area is compared with the correlation, and the amount of water attached to the sensor element 10 has been obtained as the amount of water adhering to the sensor element 10.

The imbalance responsiveness is influenced by flowability of the measurement gas G to the gas measurement section 12 of the sensor element 10 and conductivity of the oxygen ion in the sensor element 10. As the flowability of the measurement gas G to the gas measurement section 12 and the conductivity of the oxygen ion $O^{2-}$ become higher, the imbalance responsiveness becomes better. Meanwhile, higher flowability of the measurement gas G to the gas measurement section 12 means higher reachability of water in the measurement gas G to the gas measurement section 12.

According to the present embodiment, an appropriate range for the imbalance responsiveness and the amount of water adhering to the sensor element 10 in which performance of the gas sensor 1 can be maintained has been obtained by the measurement. The imbalance responsiveness can be used as a scale for measuring the flowability of the measurement gas G to the gas measurement section 12. The amount of water adhering to the sensor element 10 can be used as a scale for measuring the reachability of water to the gas measurement section 12.

As shown in FIG. 10, the imbalance responsiveness decreases as the hole-to-hole distance L3 increases. The imbalance responsiveness suddenly decreases when the hole-to-hole distance L3 exceeds 11 mm. This indicates that the imbalance responsiveness can be favorably maintained at not less than 0.25 by setting the hole-to-hole distance L3 to be not more than 11 mm.

The amount of water adhering to the sensor element 10 increases as the hole-to-hole distance L3 decreases. The amount of water adhering to the sensor element 10 suddenly increases when the hole-to-hole distance L3 becomes less than 5 mm. This indicates that the amount of water adhering to the sensor element 10 can be maintained low at less than 0.2 μL by setting the hole-to-hole distance L3 to be not less than 5 mm.

Thus, use of the inner cover 7 and the outer cover 8 which satisfy the hole-to-hole distance L3 of 5 to 11 mm makes it possible to maintain accuracy in measurement of the imbalance between the cylinders and maintain high adherability of water to the sensor element 10.

Other configurations of the gas sensor 1 of the present embodiment are similar to those of Embodiment 1. The components and the like which are denoted by the same reference signs as those of Embodiment 1 are similar to the components and the like of Embodiment 1. The present embodiment can also yield effects similar to those of Embodiment 1.

The present invention is not limited to only the aforementioned embodiments, and different embodiments can be produced without departing from the scope of the present invention.

REFERENCE SIGNS LIST

1: Gas SENSOR
2: Solid electrolyte
201: Crystal particle
31: Measurement electrode
32: Reference electrode
G: Measurement gas
A: Reference gas

The invention claimed is:

1. A gas sensor comprising:
a sensor element for measuring gas concentration, the sensor element including a solid electrolyte having oxygen ion conductivity and having a first principal surface and a second principal surface facing each other, a measurement electrode mounted on the first principal surface of the solid electrolyte and exposed to measurement gas, and a reference electrode mounted on the second principal surface of the solid electrolyte and exposed to reference gas,
an insulator which holds the sensor element;
a housing which holds the insulator;
an inner cover held by the housing and covering a projecting section of the sensor element, the projecting section being projected from a tip portion of the insulator; and
an outer cover held by the housing and covers the inner cover, wherein:
the projecting section having a gas measurement section includes an introduction section into which the measurement gas is introduced, a part of the solid electrolyte, the measurement electrode, and the reference electrode;
when an axial direction is a direction of a center axis passing through the center of the sensor element, a circumferential direction is a direction rotating around the axial direction, and in the axial direction, a tip end side is a side toward which the projecting section is projected from the insulator and a base end side is a side opposite to the tip end side,
the inner cover has an inner side wall section which is circular and is provided along the circumferential direction of the inner cover, a plurality of inner through holes through which the measurement gas passes being formed in the circumferential direction in a part of the inner side wall section in the circumferential direction of the inner side wall section, the part of the inner side wall section being closer to the base end side in the axial direction than the gas measurement section is and having a width in the axial direction;
the outer cover has an outer side wall section which is circular and is provided along the circumferential direction of the outer cover, a plurality of outer through holes through which the measurement gas passes being formed in a part of the outer side wall section in the circumferential direction of the outer side wall section, the part of the outer side wall section being closer to the tip end side in the axial direction than the gas measurement section is and having a width in the axial direction;
a distance between a center of each of the inner through holes and a center of a corresponding one of the outer through holes in the axial direction is in a range of 5 to 11 mm,
interface capacitance between crystal particles constituting the solid electrolyte and the measurement electrode and between the crystal particles constituting the solid electrolyte and the reference electrode is not more than 150 μF, and
interface resistance is not more than 80Ω, the interface resistance being resistance generated between the crystal particles constituting the solid electrolyte and the measurement electrode and between the crystal particles constituting the solid electrolyte and the reference electrode.

2. The gas sensor as set forth in claim 1, wherein:
the measurement electrode has a film thickness of 2 to 8 μm.

* * * * *